(12) United States Patent
Walker et al.

(10) Patent No.: US 9,668,413 B2
(45) Date of Patent: Jun. 6, 2017

(54) DECK PLATE CONTROL SYSTEM FOR A HEADER OF AN AGRICULTURAL HARVESTER

(71) Applicant: CNH Industrial America LLC, New Holland, PA (US)

(72) Inventors: Eric L. Walker, Leola, PA (US); Kyle O. Lauff, Pilesgrove, NJ (US); Brian P. Crow, Rock Island, IL (US); Trevor D. Book, Lititz, PA (US); Michael L. Berggren, Stockton, IA (US); Barry E. Lehman, York, PA (US); James M. Gessel, Geneseo, IL (US); Andrew V. Lauwers, Stevens, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/581,567

(22) Filed: Dec. 23, 2014

(65) Prior Publication Data

US 2016/0174461 A1    Jun. 23, 2016

(51) Int. Cl.
*A01D 45/02*    (2006.01)
*A01D 45/10*    (2006.01)

(52) U.S. Cl.
CPC ................... *A01D 45/021* (2013.01)

(58) Field of Classification Search
CPC ... A01D 45/021; A01D 45/025; A01D 45/023
USPC .................................................. 56/62, 119
See application file for complete search history.

(56) References Cited

U.S. PATENT DOCUMENTS

| | | | | |
|---|---|---|---|---|
| 3,101,579 A | * | 8/1963 | Karlsson | A01D 45/021 56/105 |
| 3,126,690 A | * | 3/1964 | Keller et al. | A01D 45/025 56/107 |
| 3,262,255 A | * | 7/1966 | Karlsson | A01D 45/025 56/107 |
| 3,271,940 A | * | 9/1966 | Ashton | A01D 41/141 56/105 |
| 3,589,110 A | * | 6/1971 | Schreiner | A01D 41/142 56/106 |

(Continued)

FOREIGN PATENT DOCUMENTS

FR    1509507 A    1/1968

*Primary Examiner* — Árpád Fábián-Kovács
(74) *Attorney, Agent, or Firm* — Peter K. Zacharias; Patrick M. Sheldrake (57) ABSTRACT

A row unit for a header of an agricultural harvester is provided that includes a first longitudinally extending stripping plate and a second longitudinally extending stripping plate each mounted on a frame and each having opposed stripping edges which define a gap between the first stripping plate and the second stripping plate. The row unit includes a gap adjustment mechanism for adjusting a size of the gap that includes first and second linkage assemblies. Each of the two linkage assemblies have an elongated linkage extending substantially parallel to the respective longitudinally extending stripping plate, and a connection mechanism connecting the elongated linkage to the longitudinally extending stripping plate. The row unit further includes a control arm connected to the first and second linkage assemblies for moving the first and second linkage assemblies between first and second positions.

20 Claims, 10 Drawing Sheets

(56) References Cited

U.S. PATENT DOCUMENTS

| | | | |
|---|---|---|---|
| RE27,554 E * | 1/1973 | Ashton et al. | A01D 45/021 56/105 |
| 3,759,021 A | 9/1973 | Schreiner et al. | |
| 3,808,783 A | 5/1974 | Sutherland et al. | |
| 5,060,464 A | 10/1991 | Caron | |
| 5,680,750 A | 10/1997 | Stefl | |
| 5,878,559 A * | 3/1999 | Cooksey | A01D 45/023 56/104 |
| 5,878,561 A * | 3/1999 | Gunn | A01D 45/023 56/119 |
| 6,226,969 B1 * | 5/2001 | Becker | A01D 45/021 56/62 |
| 6,237,312 B1 * | 5/2001 | Becker | A01D 45/021 56/119 |
| 7,913,480 B2 * | 3/2011 | Christensen | A01D 45/021 56/119 |
| 8,196,380 B2 * | 6/2012 | Carboni | A01D 45/021 56/62 |
| 8,220,235 B2 * | 7/2012 | Kowalchuk | A01D 45/021 56/62 |
| 8,224,534 B2 * | 7/2012 | Kowalchuk | A01D 45/021 460/29 |
| 8,402,727 B2 * | 3/2013 | Carboni | A01D 45/021 56/60 |
| 8,820,039 B2 * | 9/2014 | Werning | A01D 45/021 460/5 |
| 8,863,487 B2 * | 10/2014 | Calmer | A01D 45/021 56/106 |
| 9,179,602 B2 * | 11/2015 | Vandeven | A01D 45/021 |
| 2008/0092507 A1 * | 4/2008 | Bollig | A01D 45/021 56/106 |
| 2011/0011048 A1 * | 1/2011 | Hoffman | A01D 45/023 56/119 |
| 2011/0146218 A1 * | 6/2011 | Carboni | A01D 45/021 56/62 |

* cited by examiner

DECK PLATE CONTROL SYSTEM FOR A HEADER OF AN AGRICULTURAL HARVESTER

BACKGROUND

The subject application relates generally to corn header assemblies for use with agricultural harvesters. In particular, the subject application relates to an improved corn header assembly that includes a deck plate control system.

Agricultural harvesters that harvest corn are provided with headers having dividers, also generally known as snouts, for directing rows of corn stalks to row units that include ear separation chambers which are defined by deck plates or stripping plates that position the ears of corn for separation from the stalks. The ears of corn are then passed to an auger for conveying the corn to a feeder house of the agricultural harvester. Harvested corn is then processed to the harvester's inner chambers for further processing.

Conventional corn header assemblies use a rock shaft to control the separation of the deck plates (also referred to as the gap). Such deck plate separation designs have a rocker arm mounted vertically to the row unit and a control linkage below the row unit to move the deck plates. As a result, adjustment of the deck plate opening from row to row can be difficult, jerky and imprecise. Mechanical tolerances which are built into such deck plate separation design in order to improve ease of deck plate movement also leads to backlash which affects the operator's ability to properly set the deck plates. Improperly set or poorly adjusted deck plates cause grain loss, ear damage and economic losses. Such designs are also bulky, heavy and take up valuable space underneath the corn header row unit. Further, such designs can generate excess debris which can lead to trash accumulation under the corn header assembly effecting overall header efficiency and operation. In addition, conventional rocker shaft control systems typically control one of the two deck plates of a single row unit which can lead to the deck plate opening (or gap) not being aligned with the center of the row unit stalk rolls. The rocker arm control is typically mounted to the side of the row unit frame and limits, due to space constraints, the minimum row spacing of the row units.

BRIEF SUMMARY

In accordance with a first aspect, the subject application provides a row unit for a header of an agricultural harvester including a first longitudinally extending stripping plate and a second longitudinally extending stripping plate each mounted on a frame and defining a gap between the first stripping plate and the second stripping plate. The row unit further includes a gap adjustment mechanism for adjusting a size of the gap. The gap adjustment mechanism includes a first linkage assembly and a second linkage assembly. The first linkage assembly has a first elongated linkage extending substantially parallel to the first longitudinally extending stripping plate and a first connection mechanism connecting the first elongated linkage to the first longitudinally extending stripping plate. The second linkage assembly has a second elongated linkage extending substantially parallel to the second longitudinally extending stripping plate and a second connection mechanism connecting the second elongated linkage to the second longitudinally extending stripping plate. The row unit further includes a control arm operatively connected to both the first and second linkage assemblies for moving the first and second linkage assemblies between first and second positions.

In accordance with a second aspect, the subject application provides a row unit for a header of an agricultural harvester including a frame having a top side and a bottom side, a deck plate mounted on the frame, a crosslink, and an adjustment mechanism positioned about the top side of the frame and adjacent a lateral side of the deck plate for moving the deck plate. The adjustment mechanism includes a linkage assembly having an elongated linkage extending adjacent the deck plate, a primary connection mechanism connecting the elongated linkage to the deck plate, and a secondary connection mechanism connecting the elongated linkage to the deck plate. The crosslink is operatively connected to the elongated linkage for moving the deck plate between a first position and a second position.

In accordance with a further aspect, the subject application provides a system for adjusting or moving the deck plates on a corn header by parallel movement of the connecting linkage and the deck plate. In accordance with this aspect, a linkage is activated and tied from row to row by a crosslink control arm that is generally perpendicular to each of the deck plates. In accordance with this aspect the deck plate adjustment mechanism is positioned about the top side of the frame and the conventional rocker arm is eliminated and replaced by light weight control links. With such a design there is no need to position components below the row unit thus all components may be serviceable from the top side of the frame with no need to do maintenance work under the header.

The deck plates of the corn header are connected to a control arm by a pair of parallel elongated links that define two sides of a parallelogram. The elongated links are designed such that as the parallelogram is collapsed or expanded the deck plate moves tighter or wider. When the parallelogram is collapsed such that the elongated links are close together the deck plate opens up to allow larger stalks to pass. When the parallelogram is expanded such that the elongated links are further apart the deck plates close to allow the row unit to work effectively with smaller stalks. The left deck plate can be timed to the right deck plate by the control arm. This same control arm can be used to connect adjustment mechanisms from row unit to row unit. The two ends of the deck plate through which the corn enters the header define a wedge opening. The wedge opening of the deck plates can be either set fixed in the design, or the design can be made to allow the front of the deck plates to be at a different width than the rear.

In accordance with other aspects, the subject application further provides deck plates connected to a control arm by a pair of parallel long links that define two sides of a parallelogram. The parallel link can be made with a rotating cam, triangular link arms, L-link arms, or the like. Shape of the control arm and parallel links can be any shape e.g., flat, oval, round, square or L-shape. The distance the deck plates open can be changed with the design to allow 100% closure or maximum available opening.

BRIEF DESCRIPTION OF THE SEVERAL VIEWS OF THE DRAWINGS

The foregoing summary, as well as the following detailed description of several aspects of the subject application, will be better understood when read in conjunction with the appended drawings. For the purpose of illustrating the subject application there are shown in the drawings several aspects, but it should be understood that the subject application is not limited to the precise arrangements and instrumentalities shown.

In the drawings.

DETAILED DESCRIPTION

Reference will now be made in detail to aspects of the subject application illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, above, below and diagonal, are used with respect to the accompanying drawings. Such directional terms used in conjunction with the following description of the drawings should not be construed to limit the scope of the subject disclosure in any manner not explicitly set forth. Additionally, the term "a," as used in the specification, means "at least one." The terminology includes the words above specifically mentioned, derivatives thereof, and words of similar import.

The terms "corn," "ear," "stalk," and "crop material" are used throughout the specification for convenience and it should be understood that these terms are not intended to be limiting. Thus, "corn" refers to that part of a crop which is harvested and separated from discardable portions of the crop material. The term "deck plate" is used interchangeably with the term "stripping plate."

Figure 1:
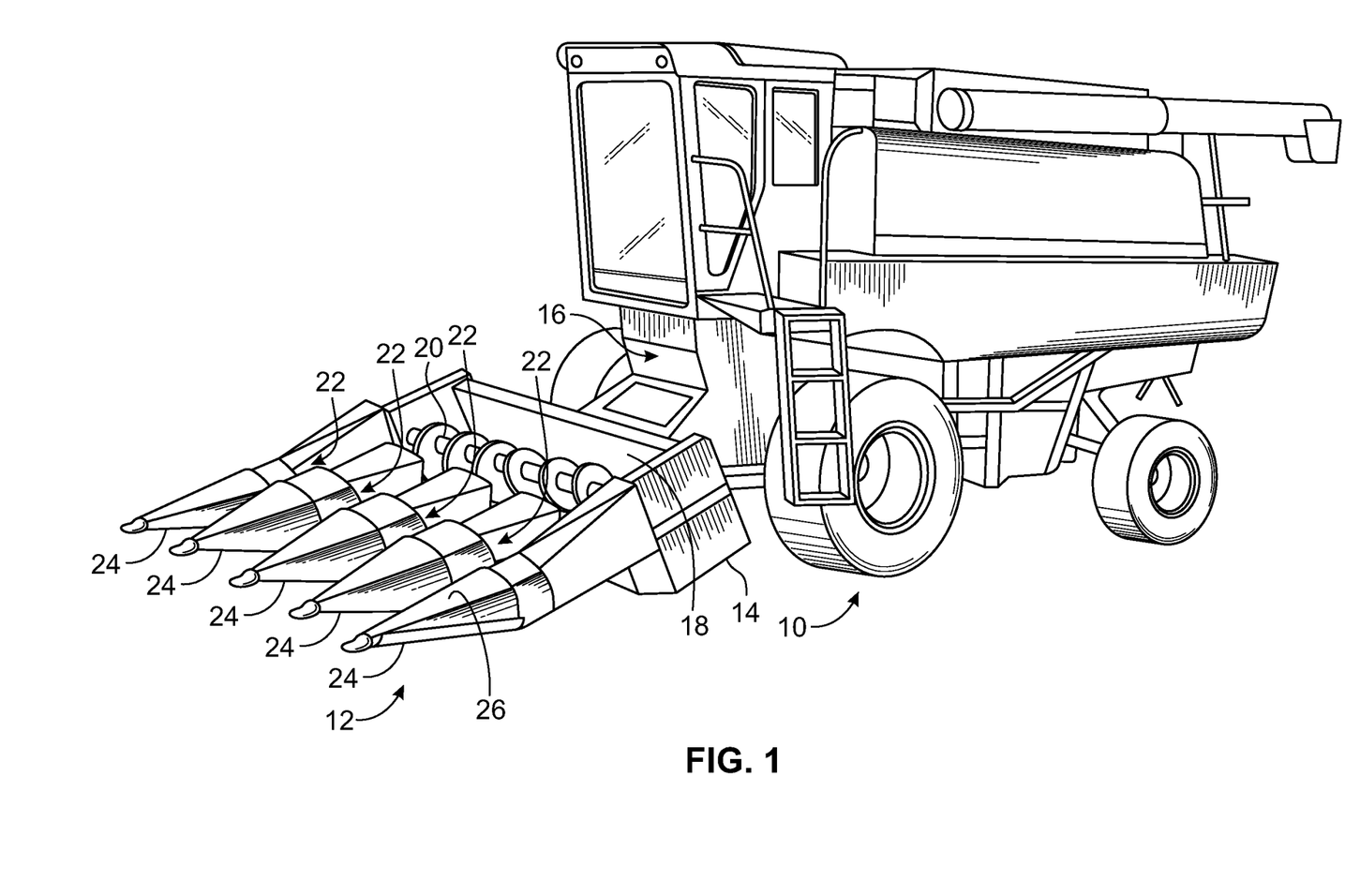
FIG. 1 is a perspective view of an agricultural harvester including a corn header according to an aspect of the subject application.

Referring now to the drawings wherein aspects of the subject application are shown, FIG. 1 illustrates corn header assembly 12 according to an aspect of the subject application as applied to agricultural harvester 10. The corn header assembly 12 is an improvement to current conventional corn header assemblies of agricultural harvesters by incorporating a deck plate control system that can allow for more efficient adjustment of the deck plate opening to respond to variations in corn stalk width by way of a simple, compact and substantially flat design. The corn header assembly 12 is shown to be operatively connected to the agricultural harvester 10 for harvesting corn and feeding the corn to feeder house 16 for receiving crop residue, cutting, chopping and propelling the residue rearwardly and outwardly from the agricultural harvester 10 while retaining the valuable corn ears and kernels. Such feeder houses and harvesting operations are known in the art and a further detailed description of their structure, function and operation is not necessary for a complete understanding of this particular aspect of the subject disclosure. However, typical corn headers applicable to the subject disclosure are disclosed in U.S. Pat. Nos. 3,808,783 and 3,759,021, the entire disclosures of which are incorporated by reference herein for all purposes.

The corn header assembly 12 includes header frame 14 for mounting to a forward end of the agricultural harvester 10, a conveyor 20 (such as an auger) extending lengthwise across the header frame 14 for conveying crop material to a combine feeding location or feeder house 16 through channel 18 and a plurality of row units 22 extending forwardly from the header frame 14. The corn header assembly 12 further includes a plurality of dividers 24 extending forward from the header frame 14. Such dividers 24 are known in the art and a further detailed description of their structure, function and operation is not necessary for a complete understanding of the subject application.

Figure 2:
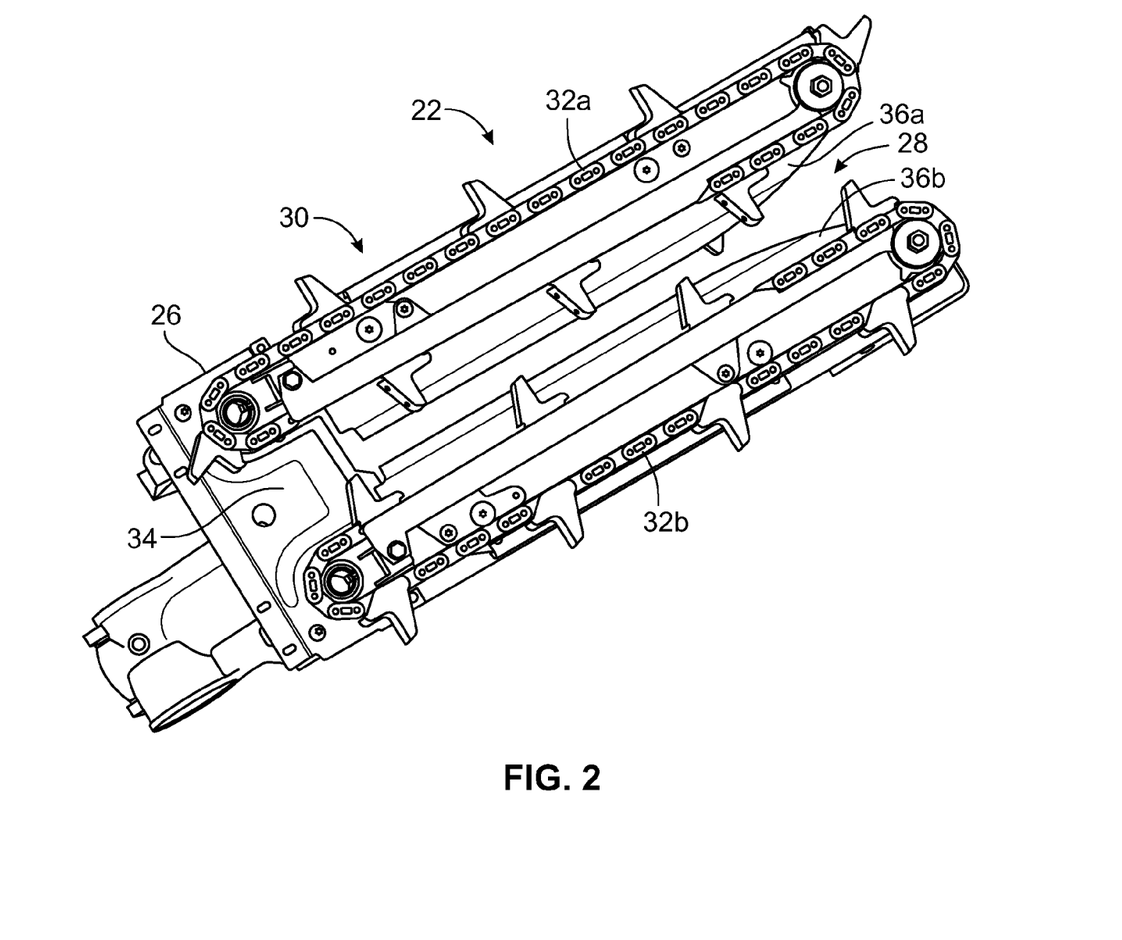
FIG. 2 is a top perspective view of a row unit of a corn header in accordance with the subject application.

As shown in FIG. 2 which is a perspective view of a single row unit 22 in accordance with an aspect of the subject application, stripping plates or deck plates 36a, 36b are shown which define a gap 28 therebetween which is open towards the forward end of the row unit 10. Breast plate 34 defines the closed end region of the gap 28 and is positioned at an end of the row unit 22 closest to the agricultural harvester 10, i.e., a proximal end of the row unit.

Figure 3:
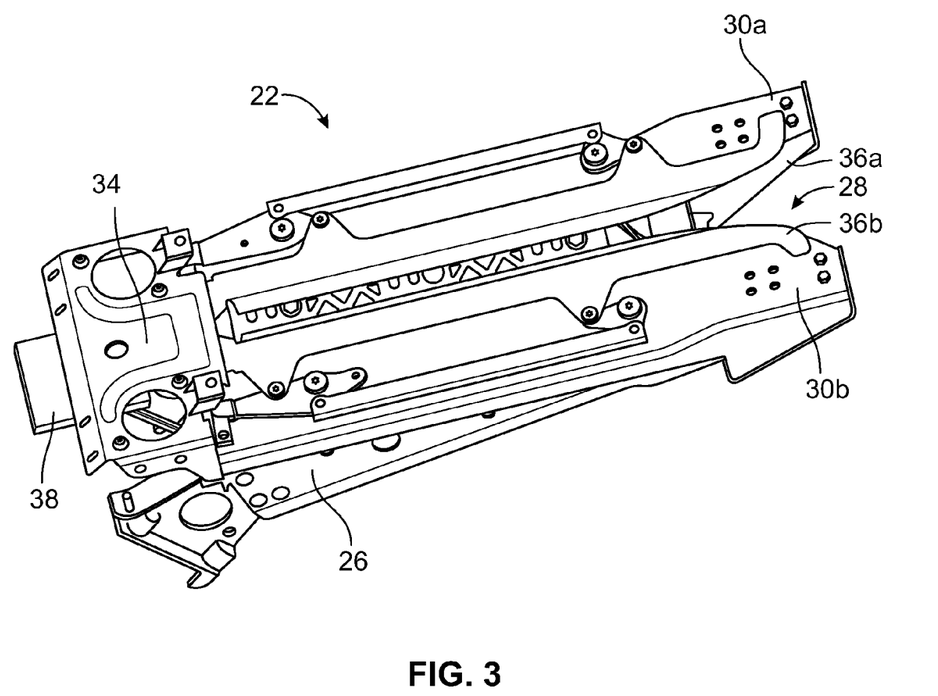
FIG. 3 is another top perspective view of the row unit of FIG. 2 with certain components omitted.
Figure 4:
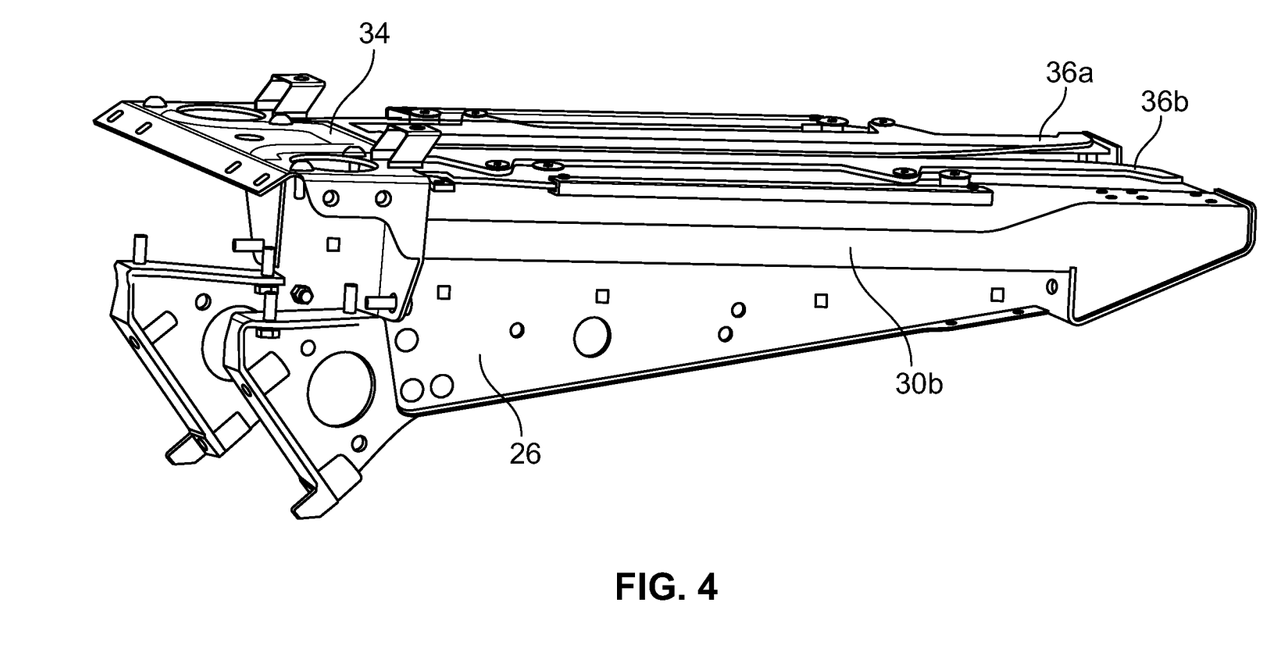
FIG. 4 is a side perspective view of the row unit of FIG. 3.

FIGS. 3 and 4 show a top perspective view and a side perspective view of the row unit 22 without a gathering chain assembly. The row unit 22 includes frame 26 forming two row unit arms 30a, 30b, the breast plate 34, and the two stripping plates 36a, 36b which define the gap 28. The frame has a top side and a bottom side. FIG. 3 shows gear case 38 positioned on a lower portion of the frame 26. The gear case 38 generates power to drive the gathering chains 32a, 32b of the row unit 22.

In other words, the row unit 22 includes a first longitudinally extending stripping plate 36a and a second longitudinally extending stripping plate 36b each mounted on the frame 26 and each having opposed stripping edges which define the gap 28 between the first stripping plate 36a and the second stripping plate 36b. In accordance with an aspect of the subject application a first deck plate may be positioned at an angle other than parallel with respect to the second deck plate. In such an aspect a relative angle between the first and second deck plates may be fixed at assembly of the row unit or may be adjustable by an operator. According to such an aspect, the ends of the first and second deck plates define a wedge opening through which corn enters the row unit. The wedge opening can be either set fixed in the design, or the design of the row unit can allow the front of the deck plates (that is the end of the deck plates through which corn enters the row unit) to be at a different width than the width of the rear of the deck plate e.g., wider towards the front and narrower towards the rear.

Figure 5:
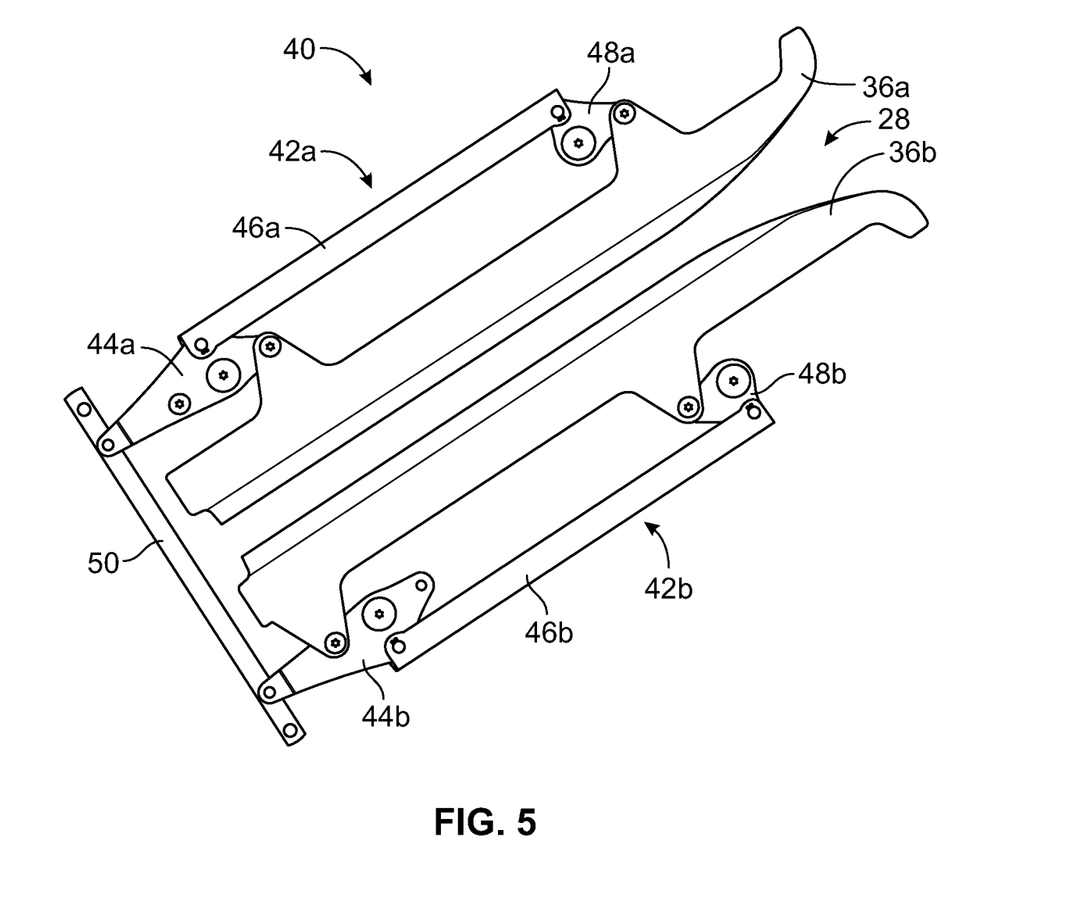
FIG. 5 is a perspective view of a gap adjustment mechanism of the row unit of FIG. 2.

As shown in FIG. 5, the row unit 22 further includes a gap adjustment mechanism 40 for adjusting a size of the gap 28. The gap adjustment mechanism 40 includes first linkage assembly 42a having a first elongated linkage 46a extending substantially parallel to the first longitudinally extending stripping plate 36a and a first connection mechanism 44a connecting the first elongated linkage 46a to the first longitudinally extending stripping plate 36a. The gap adjustment mechanism 40 also includes second linkage assembly 42b having a second elongated linkage 46b extending substantially parallel to the second longitudinally extending stripping plate 36b and a second connection mechanism 44b connecting the second elongated linkage 46b to the second longitudinally extending stripping plate 36b.

Referring back to FIG. 3, the gap adjustment mechanism 40 is positioned above gear case 38. Additionally, the gap adjustment mechanism 40 is positioned above the row unit arms about a top side of the frame to allow for ease of maintenance of the row unit 22. Further, the linkage assemblies and connection mechanisms are adjacent a lateral side of the deck plates such that the components of the gap adjustment mechanism all lay substantially within a plane defined by the stripping plates.

The row unit 22 also includes a control arm or crosslink 50 operatively connected to the first and second linkage assemblies 42a and 42b for moving the first and second linkage assemblies 42a and 42b between first and second positions. In accordance with certain aspects of the subject application, the elongated linkages are positioned substantially transverse or perpendicular to the crosslink.

Figure 6A:
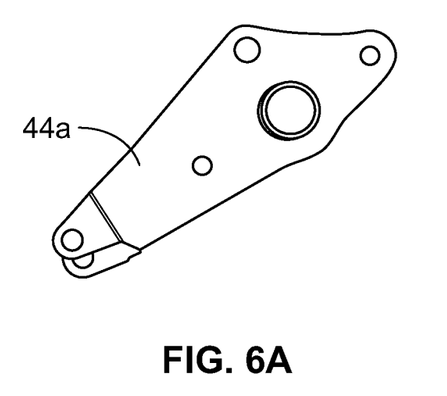
FIGS. 6A-D are perspective views of connection mechanisms of the gap adjustment mechanism of FIG. 5.
Figure 6B:
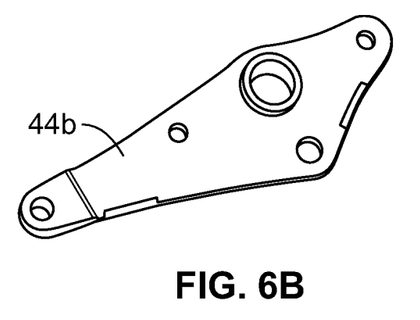

The first and second linkage assemblies 42a, 42b respectively include the first and the second connection mechanisms 44a, 44b. Each of the first and second connection mechanisms 44a, 44b may be a bell crank, a rotating cam, a linkage assembly, a pivot mechanism, or the like. FIGS. 6A and 6B illustrate examples of connection mechanisms suitable for use as first and second connection mechanisms 44a, 44b.

Connection mechanism 44a is configured and shaped as best shown in FIG. 6A as an elongated bell crank. The connection mechanism 44a is formed from two planar mirrored elements that come together each having a generally elongated shape with a central aperture for pivotal connection to the row unit frame. A posterior or tail end of the connection mechanism extends further distally from the central aperture than an anterior end of the connection mechanism. Each posterior end of the two planar elements is stepped so as to form a receiving gap to accommodate the shape of the control arm 50 and includes an aperture for pivotal connection thereto. Thus, when the two mirrored planar elements come together, the posterior ends create a two-pronged end for receiving and mounting to the control arm. The anterior end of the connection mechanism is generally arrowhead-shaped with a lateral side extending outwardly from the central aperture. Surrounding the central aperture at approximately every ninety degrees are apertures for pivotal connections. As best shown in FIG. 5 the anterior most aperture is pivotally connected to the deck plate 36a while the lateral most aperture connects to the first elongated linkage 46a about the first elongated linkage's proximal end. As such, the connection mechanism 44a is pivotally connected to the deck plate at a position more forwardly or more distally from the control arm than the point at which the first elongated linkage is pivotally connected to the connection mechanism. Accordingly, this causes the deck plate 36a to move inwardly when the control arm moves to the left side of the header.

Connection mechanism 44b is configured and shaped as best shown in FIG. 6B as an elongated bell crank. In an aspect, the connection mechanism is configured substantially as a mirror image of connection mechanism 44a. The connection mechanism 44b is formed from two planar mirrored elements that come together each having a generally elongated shape with a central aperture for pivotal connection to the row unit frame. A posterior or tail end of the connection mechanism extends further distally from the central aperture than an anterior end of the connection mechanism. Each posterior end of the planar elements is stepped so as to form a receiving gap to accommodate the shape of the control arm 50 and includes an aperture for pivotal connection thereto. Thus, when the two mirrored planar elements come together, the posterior ends create a two-pronged end for receiving and mounting to the control arm. The anterior end of the connection mechanism is generally triangular-shaped with one of its lateral sides extending further out than its opposite lateral side from the central aperture. The connection mechanism 44b includes an aperture about its most anterior end, an aperture about its wider lateral end, and an aperture between the central aperture and the posterior end. Each of these apertures are spaced apart approximately ninety degrees. As best shown in FIG. 5 the aperture between the central aperture and the posterior end is pivotally connected to the deck plate 36b while the lateral side aperture connects to the second elongated linkage 46b about the second elongated linkage's proximal end. As such, the connection mechanism 44b is pivotally connected to the second elongated linkage at a position more forwardly or more distally from the control arm than the point at which the deck plate is pivotally connected to the connection mechanism. Accordingly, this causes the deck plate 36b to move inwardly when the control arm moves to the left side of the header.

Figure 6C:
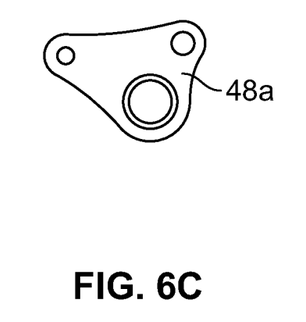
Figure 6D:
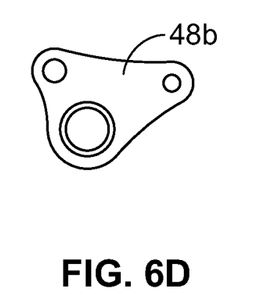

Secondary connections mechanisms 48a, 48b are configured as shown in FIGS. 6C and 6D. Each of these secondary connection mechanisms includes a central aperture for connecting to the row unit frame and a pair of spaced apart apertures for connecting to the elongated linkage and the deck plate. As shown in FIG. 5, the secondary connection mechanism 48a has the deck plate pivotally attached at a point more forwardly or distally from the control arm than its pivotal attachment to the first elongated linkage 46a. Further, the secondary connection mechanism 48b has the second elongated linkage 46b pivotally attached at a point more forwardly or distally from the control arm than its pivotal attachment to the deck plate 36b. Accordingly, this configuration of the secondary connection mechanisms in combination with the connection mechanisms 44a, 44b causes the deck plates to both move inwardly when then control arm moves to the left side of the header. Of course, the foregoing connection mechanisms can alternatively be configured such that the deck plates move inwardly when the control arm moves to the right side of the header.

Referring back to FIGS. 3 and 5, in certain aspects of the subject application each of the first and second connection mechanisms 44a, 44b is a pivot mechanism connected to respective elongated linkages and stripping plates, and pivotably connected to the frame. It can be seen that the manner and configuration in which the connection mechanisms 44a, 44b are connected to the respective stripping plates 46a, 46b determines the response of each of the stripping plates 46a, 46b to a rotation of the connection mechanisms 44a, 44b.

By configuring each of the first and second connection mechanisms 44a, 44b thusly with respect to the deck plates when viewed as shown in FIG. 5, a clockwise rotation of the first connection mechanism 44a causes the stripping plate 36a to move medially with respect to the center of the row unit 22. Likewise, a clockwise rotation of the second connection mechanism 44b causes the stripping plate 36b to also move medially with respect to the center of the row unit 22.

In other words, the first and second connection mechanisms 44a, 44b are each connected to the stripping plates 36a, 36b in order that the first and second stripping plates 36a, 36b respond by moving parallel respectively to a motion of the control arm 50. This effect is achieved because the motion of the control arm 50 in a particular direction causes a similar rotation of each of the first and second connection mechanisms 44a, 44b. This rotation of each of the first and second connection mechanisms in the same direction (that is clockwise or counter-clockwise) in turn causes the first and second stripping plates to move either together (medially with respect to the frame 26) or apart (laterally with respect to the frame 26.) Thus, for a particular motion of the control arm 50, the first and second connection mechanisms 44a, 44b will rotate or pivot in the same direction which causes the first and second stripping plates 36a, 36b to each move either laterally or medially with respect to the frame 26. The effect of the motion of stripping plates 36a and 36b acts to increase or decrease the size of the gap 28.

The gap adjustment mechanism 40 is responsive to movement of the control arm 50 in a first direction to move the first and second linkage assemblies 42a, 42b to a first position, and in a second direction to move the first and second linkage assemblies 42a, 42b to a second position. The first position can correspond to a narrowed gap position while the second position can correspond to a widened gap position. That is, the width size of the gap 28 is larger in the second position than the width size of the gap 28 in the first position.

In accordance with another aspect of the subject application the first and second linkage assemblies 42a, 42b include a first secondary connection mechanisms 48a and a second secondary connection mechanism 48b. FIGS. 6C and 6D illustrate bell cranks suitable for use as the first and second secondary connection mechanisms 48a, 48b. However, bell cranks of other configurations suitable in design for the intended purpose are also applicable.

In certain aspects of the subject application each of the first and second elongated linkages 46a, 46b moves in parallel motion with the first and second longitudinally extending stripping plates 36a, 36b respectively. This is achieved by configuring the spacing between the elongated linkage and the deck plate via the connection mechanism e.g., connection mechanism 44a, 48a, to be the same throughout their respective range of motions.

A gap adjust mechanism in accordance with an aspect of the subject application is substantially planar when fully assembled. The linkage assemblies and connection mechanisms of the gap adjustment mechanism have generally planar profiles as shown e.g., in FIGS. 4 and 5. Moreover, the linkage assemblies and connection mechanisms are positioned such that they are adjacent a lateral side of the deck plates. In this configuration, the linkage assemblies and connection mechanism are all positioned above a top surface of the row unit frame. As such, the gap adjustment mechanism of the subject application allows the entire mechanism to lay substantially within or adjacent a plane defined by the deck plate(s), thereby reducing the amount of space necessary for installation on the row units and to facilitate spacing of the row units at very narrow spacings.

In operation during harvesting, rows of plants to be harvested are aligned and directed to the gap 28 formed by the stripping plates 36a, 36b. As the agricultural harvester 10 moves across a row of crops, plants are guided towards the gap 28 where ears of corn are then stripped from the stalks between the stripping plates 36a, 36b. After separation from the ears of corn the stalks fall underneath the agricultural harvester 10 and the ears of corn are moved rearward and into the header frame 14 by the action of gathering chains 32a, 32b. Conveyor 20 then moves the ears of corn to the center of the header frame 14 so as to be fed into the feeder house 16 through the channel 18. The configuration and operation of such intake arrangements are typical of agricultural harvesters.

Furthermore, the gap adjustment mechanism 40 allows each of the stripping plates 36a, 36b to move in parallel motion between a first position and a second position. The size of the gap 28 when the deck plates 36a, 36b are in the first position is suitable for certain stalk widths while the size of the gap 28 when the deck plates 36a, 36b are in the second position is suitable for certain other stalk widths. The size of the gap 28 generated by the gap adjustment mechanism 40 is controlled by movement of the control arm 50. The control arm 50 is operatively connected to a drive or other mechanism for changing its position, for example a motor (not shown) which is changed manually and/or remotely by an operator.

The subject application advantageously provides for the gap adjustment mechanism 40 positioned above the frame 26 and/or about a top side of the frame 26 as opposed to below the frame 26 as it is positioned in conventional row unit designs. Moreover, as the gap adjustment mechanism 40 is positioned on the top side of the frame 26 all components of the gap adjustment mechanism may be serviceable from a top side of the header and/or row unit.

In sum, the row unit 22 has a deck plate connected to a control arm by a pair of parallel links (e.g. the linkage assemblies) that together define a parallelogram. The parallel links are designed such that as the parallelogram is collapsed or expanded the deck plate moves tighter or wider and the area taken up by the parallelogram increases or decreases. In operation, when the parallelogram is collapsed such that the elongated legs are close together the deck plate gap opens up to allow larger stalks to pass. When the parallelogram is expanded such that the elongated links are further apart the deck plates close to work with smaller stalks. Thus, the parallelogram is characterized by an area that is responsive to movement of the crosslink.

The first deck plate is timed to the second deck plate through the mechanism of the control arm. This same control arm can extend across the entire width of the header connecting the linkage assemblies from all of the plurality of row units. The wedge opening of the deck plates can be either set fixed in the design, or the design can be made to allow the gap defined by the front of the deck plates to be a different width than the gap defined by the rear of the deck plates.

Systems in accordance with aspects of the subject application provide for a number of design options. The parallel links of the gap adjustment mechanism can be made implemented in various ways e.g., a rotating cam, a triangular link arm, an L-link arm, a pivot mechanism, or the like. Further, the shape of the control arm and parallel links can be flat, oval, round, square or L-shape. Furthermore, the gap between the deck plates opening can be designed to allow 100% closure and/or maximum available opening.

Referring now to FIGS. 7-10, in accordance with another aspect, the subject application provides a row unit 122 for a header of an agricultural harvester having a first longitudinally extending stripping plate 136a and a second longitudinally extending stripping plate 136b which define a gap 128 between the first stripping plate 136a and the second stripping plate 136b. The row unit further includes a gap adjustment mechanism 140 for adjusting a size of the gap 128, and a control arm similar to control arm 50 described above. The gap adjustment mechanism 140 includes a first linkage assembly 142a having a first elongated linkage 146a extending substantially parallel to the first longitudinally extending stripping plate 136a and a first connection mechanism 144a connecting the first elongated linkage 146a to the first longitudinally extending stripping plate 136a. The gap adjustment mechanism 140 also includes a second linkage assembly 142b having a second elongated linkage 146b extending substantially parallel to the second longitudinally extending stripping plate 136b and a second connection mechanism 144b connecting the second elongated linkage 146b to the second longitudinally extending stripping plate 136b. The gap adjustment mechanism 140 further includes a first secondary connection mechanism 148a and a second secondary connection mechanism 148b which respectively connect the first elongated linkage 146a to the first longitudinally extending stripping plate 136a and the second elongated linkage 146b to the longitudinally extending stripping plate 136b.

The control arm is operatively connected to the first and second linkage assemblies 142a and 142b for moving the first and second linkage assemblies 142a and 142b between first and second positions in a manner similar to control arm 50 described above.

Figure 7:
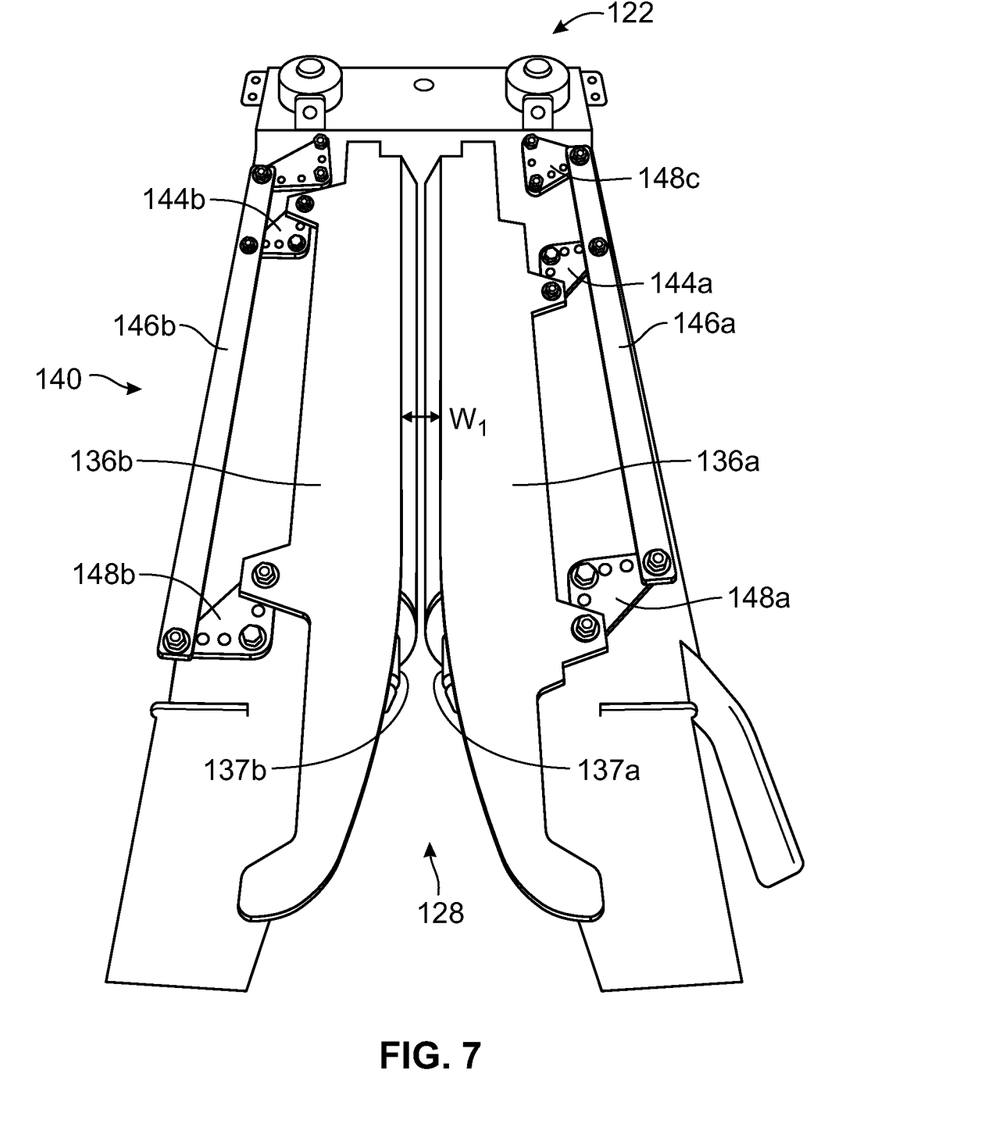
FIG. 7 is a perspective view of a gap adjustment mechanism in a first position for a row unit in accordance with another aspect of the subject application.
Figure 8:
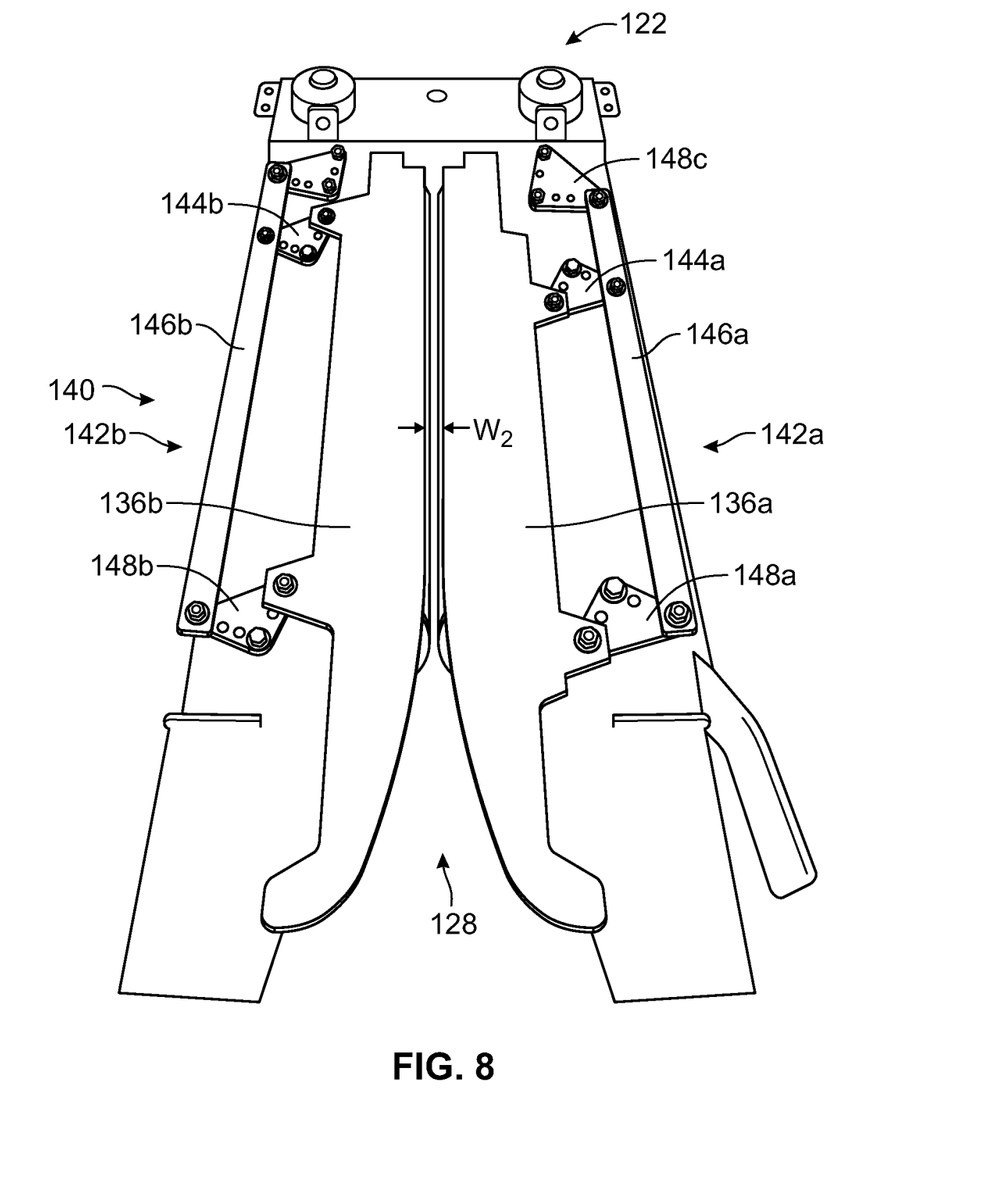
FIG. 8 is a perspective view of the gap adjustment mechanism of FIG. 7 in a second position.

As shown in FIG. 7, the first stripping plate 136a and the second stripping plate 136b are firstly positioned so that the gap 128 defines a first width $W_1$. In FIG. 8, the first stripping plate 136a and the second stripping plate 136b are secondly positioned so that the gap 128 defines a second width $W_2$ which is narrower than the first width. Accordingly, the gap is larger in the second position than in the first position.

The row unit 122 also includes a pair of stalk rolls 137a, 137b mounted to the frame which rotate to pull stalks downwardly through the gap defined by the stripping plates. In accordance with the subject application, the first and second linkage assemblies move simultaneously between the first and second positions to maintain the gap centered over the stalk rolls.

Figure 9:
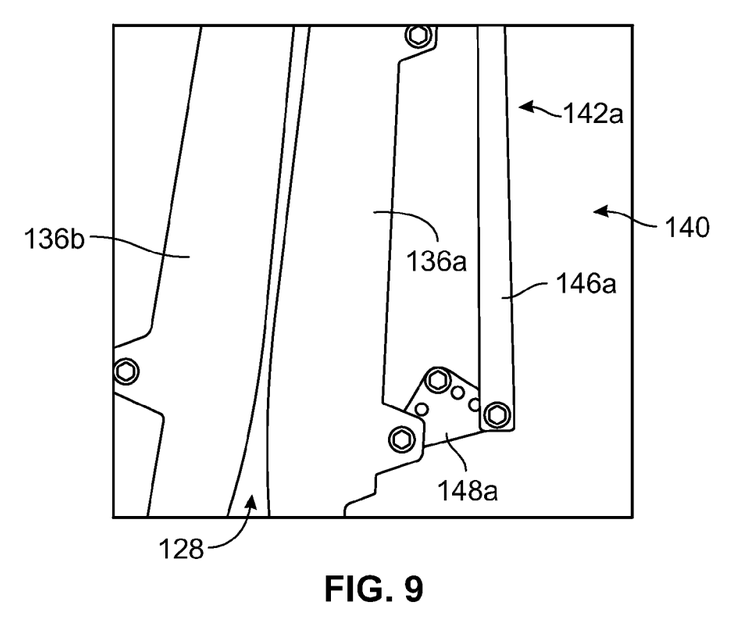
FIG. 9 is an enlarged, partial perspective view of the gap adjustment mechanism of FIG. 8.
Figure 10:
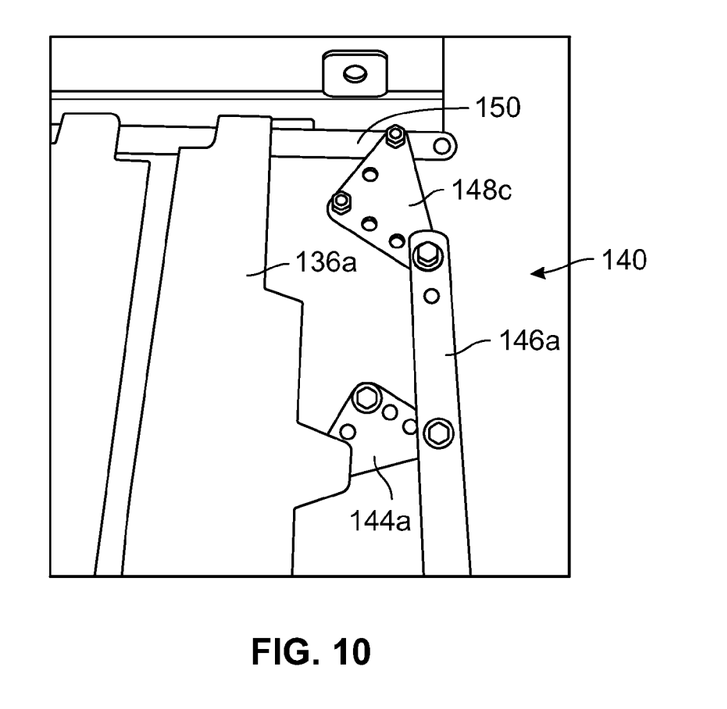
FIG. 10 is another enlarged, partial perspective view of the gap adjustment mechanism of FIG. 8.

FIG. 9 provides an enlarged detail view of a bell crank used as a secondary connection mechanism. FIG. 10 shows an enlarged detailed view of a bell crank used as a primary or tertiary connection mechanism. The connection mechanism 144a is connected to the elongated linkage 146a but is not directly connected to the control arm 150. In this aspect an additional tertiary bell crank 148c connects the elongated linkage 146a of the first linkage assembly to the control arm 150 so that the control arm is operatively connected to the elongated linkage 146a for moving the deck plate 136a between a first position and a second position. Connection mechanism 144b and second linkage assembly are similarly configured as described for connection mechanism 144a and first linkage assembly. Further, the second linkage assembly 142b can include a tertiary connection mechanism similar to tertiary connection mechanism 148c.

Figure 11:
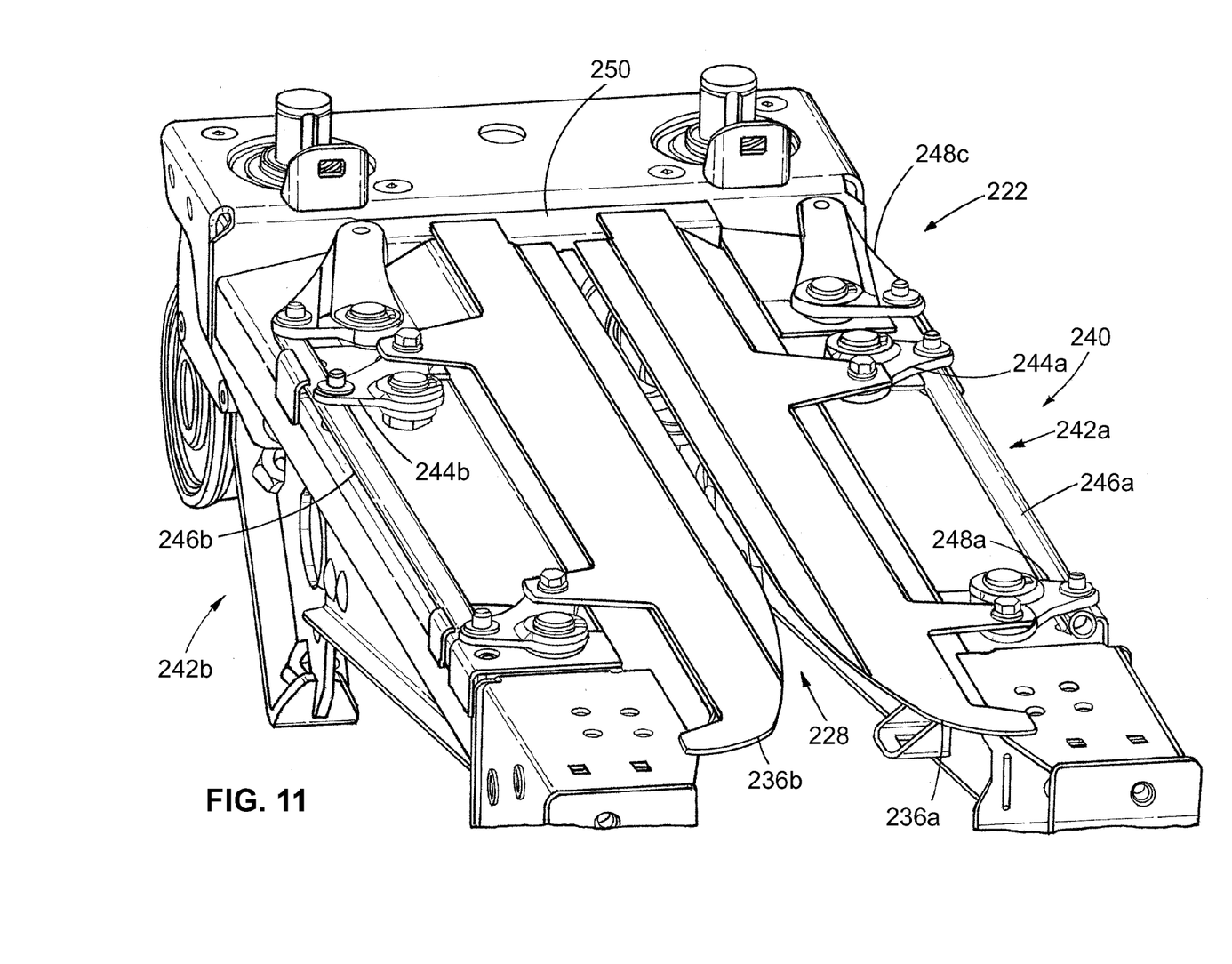
FIG. 11 is a perspective view of a gap adjustment mechanism in accordance with yet another aspect of the subject application.

FIG. 11 illustrates yet another aspect of a row unit 222 in accordance with the subject application. Row unit 222 is similarly configured as row unit 122 described above and includes a first longitudinally extending stripping plate 236a, a second longitudinally extending stripping plate 236b, a gap 228 between the first and second stripping plates which define the gap, a gap adjustment mechanism 240 similar to gap adjustment mechanism 140 described above, and a control arm 250. The gap adjustment mechanism 240 includes a first linkage assembly 242a having a first elongated linkage 246a extending substantially parallel to the first longitudinally extending stripping plate. The gap adjustment mechanism 240 also includes a first connection mechanism 244a, a first secondary connection mechanism 248a, and a tertiary connection mechanism 248c, each connecting the first elongated linkage to the first longitudinally extending stripping plate. The gap adjustment mechanism 240 further includes a second linkage assembly 242b having a second elongated linkage 246b extending substantially parallel to the second longitudinally extending stripping plate, a second connection mechanism 244b and a tertiary connection mechanism connecting the second elongated linkage to the second longitudinally extending stripping plate.

It will be appreciated by those skilled in the art that changes could be made to the various aspects described above without departing from the broad inventive concept thereof. It is to be understood, therefore, that the subject application is not limited to the particular aspects disclosed, but it is intended to cover modifications within the spirit and scope of the subject application as defined by the appended claims.

We claim:

1. A row unit for a header of an agricultural harvester comprising:
   a frame comprising a top surface;
   a first longitudinally extending stripping plate and a second longitudinally extending stripping plate each adjacent to and mounted on the top surface of the frame and defining a gap between the first stripping plate and the second stripping plate;
   a gap adjustment mechanism for adjusting a size of the gap, the gap adjustment mechanism comprising:
      a first linkage assembly having:
         a first elongated linkage extending substantially parallel to the first longitudinally extending stripping plate, and
         a first connection mechanism connecting the first elongated linkage to the first longitudinally extending stripping plate, and
      a second linkage assembly having:
         a second elongated linkage extending substantially parallel to the second longitudinally extending stripping plate, and
         a second connection mechanism connecting the second elongated linkage to the second longitudinally extending stripping plate; and
   a control arm operatively connected to the first and second linkage assemblies for moving the first and second linkage assemblies between first and second positions,
   wherein at least one of the first elongated linkage, the first connection mechanism, the second elongated linkage, and the second connection mechanism is adjacent to and mounted on the top surface of the frame.

2. The row unit of claim 1, wherein the control arm is directly connected to the first connection mechanism and the second connection mechanism.

3. The row unit of claim 1, further comprising a gear case operatively driving the row unit and wherein the gap adjustment mechanism is positioned above the gear case.

4. The row unit of claim 1, wherein each of the first and second connection mechanisms is a bell crank, a rotating cam, a linkage assembly, or a pivot mechanism.

5. The row unit of claim 1, wherein each of the first and second connection mechanisms is a pivot mechanism connected to respective elongated linkages and stripping plates, and pivotably connected to the frame.

6. The row unit of claim 1, wherein the first connection mechanism is a bell crank operatively connected to the first elongated linkage.

7. The row unit of claim 1, wherein the gap adjustment mechanism is responsive to movement of the control arm in a first direction to move the first and second linkage assemblies to the first position and in a second direction to move the first and second linkage assemblies to the second position.

8. The row unit of claim 1, wherein the size of the gap is larger in the second position than the size of the gap in the first position.

9. The row unit of claim 1, wherein the first linkage assembly further comprises a first secondary connection mechanism connecting the first elongated linkage to the first longitudinally extending stripping plate.

10. The row unit of claim 1, wherein the first linkage assembly is positioned adjacent a lateral side of the first stripping plate and the second linkage assembly is positioned adjacent a lateral side of the second stripping plate.

11. The row unit of claim 1, further comprising a pair of stalk rolls mounted to the frame, and wherein the first and second linkage assemblies move simultaneously to maintain the gap centered over the stalk rolls.

12. The row unit of claim 1, wherein the entire gap adjustment mechanism lays substantially within a plane defined by the stripping plates.

13. A row unit for a header of an agricultural harvester comprising:
a frame having a top surface;
a deck plate mounted on the frame;
an adjustment mechanism for moving the deck plate, the adjustment mechanism including:
a linkage assembly having:
an elongated linkage extending adjacent the deck plate,
a primary connection mechanism directly pivotally connected to the top surface of the frame at a proximal end of the deck plate and connecting the elongated linkage to the deck plate, and
a secondary connection mechanism connecting the elongated linkage to the deck plate and connected to the top surface of the frame at a distal end of the deck plate; and
a crosslink operatively connected to the elongated linkage for moving the deck plate between a first position and a second position.

14. The row unit of claim 13, wherein the elongated linkage is positioned substantially transverse to the crosslink.

15. The row unit of claim 13, wherein each of the primary and secondary connection mechanisms is a bell crank, a rotating cam, a linkage, or a pivot mechanism.

16. The row unit of claim 13, wherein the elongated linkage is configured to move in parallel with the deck plate.

17. The row unit of claim 13, further comprising a self-adjusting mechanism operatively connected to the crosslink for adjusting the position of the elongated linkage.

18. The row unit of claim 13, further comprising a gear case operatively driving the row unit and wherein the adjustment mechanism is positioned above the gear case.

19. The row unit of claim 13, wherein the entire adjustment mechanism lies substantially within a plane defined by the deck plate.

20. A row unit for a header of an agricultural harvester comprising:
a frame including a row unit arm having a top surface;
a deck plate mounted on the top surface and extending substantially horizontally along the row unit arm;
an adjustment mechanism for moving the deck plate, the adjustment mechanism including:
a linkage assembly having:
an elongated linkage extending along the deck plate,
a primary connection mechanism pivotally connected to the elongated linkage, pivotally connected to the deck plate, and directly pivotally connected to the top surface at a proximal end of the row unit arm to define a first pivot axis, and
a secondary connection mechanism pivotally connecting the elongated linkage to the deck plate and directly pivotally connected to the top surface at a distal end of the row unit arm to define a second pivot axis, wherein the first and second pivot axes extend substantially vertically; and
a crosslink operatively connected to the elongated linkage for moving the deck plate between a first position and a second position.

* * * * *